United States Patent
Lowry et al.

(10) Patent No.: US 8,347,462 B2
(45) Date of Patent: Jan. 8, 2013

(54) SLIDING AND ROTATING HINGE MODULE

(75) Inventors: David A. Lowry, Wayne, PA (US);
Mark Cooper, Boothwyn, PA (US)

(73) Assignee: Southco, Inc., Concordville, PA (US)

( * ) Notice: Subject to any disclaimer, the term of this patent is extended or adjusted under 35 U.S.C. 154(b) by 234 days.

(21) Appl. No.: 11/997,554

(22) PCT Filed: Aug. 1, 2006

(86) PCT No.: PCT/US2006/030055
§ 371 (c)(1),
(2), (4) Date: Jan. 31, 2008

(87) PCT Pub. No.: WO2007/016613
PCT Pub. Date: Feb. 8, 2007

(65) Prior Publication Data
US 2008/0189908 A1    Aug. 14, 2008

Related U.S. Application Data

(60) Provisional application No. 60/704,325, filed on Aug. 1, 2005.

(51) Int. Cl.
*E05D 15/00* (2006.01)
(52) U.S. Cl. ........................................................ 16/362
(58) Field of Classification Search ............... 16/362, 16/231, 232, 286.1, 352, 345, 327, 319, 86.2; 248/298.1, 292.13, 424, 429, 419, 423, 286.1; 312/9.1, 311, 323, 9.48, 9.53; 108/140, 142, 108/143; 361/679.39
See application file for complete search history.

(56) References Cited

U.S. PATENT DOCUMENTS

| | | | | |
|---|---|---|---|---|
| 2,655,422 A | * | 10/1953 | Gussack | 312/333 |
| 2,710,782 A | | 6/1955 | Chaft | |
| 4,592,600 A | * | 6/1986 | Bohnet et al. | 312/9.41 |
| 4,607,884 A | * | 8/1986 | Heling | 297/341 |
| 4,625,657 A | * | 12/1986 | Little et al. | 108/93 |
| 4,764,075 A | | 8/1988 | Cox et al. | |
| 4,778,228 A | * | 10/1988 | Ackeret | 312/9.43 |
| 4,836,482 A | | 6/1989 | Sokol | |
| 5,199,777 A | | 4/1993 | Taima et al. | |
| 5,257,767 A | | 11/1993 | McConnell | |
| 5,487,525 A | | 1/1996 | Drabczyk et al. | |
| 5,697,303 A | | 12/1997 | Allan | |
| 5,847,685 A | * | 12/1998 | Otsuki | 345/87 |
| 5,881,984 A | * | 3/1999 | Lin | 248/284.1 |
| 6,125,030 A | | 9/2000 | Mola et al. | |
| 6,178,085 B1 | * | 1/2001 | Leung | 361/679.56 |
| 6,186,460 B1 | | 2/2001 | Lin | |
| 6,270,047 B1 | | 8/2001 | Hudson | |
| 6,832,862 B2 | * | 12/2004 | Giese | 396/518 |
| 6,871,384 B2 | | 3/2005 | Novin et al. | |
| 6,909,408 B2 | * | 6/2005 | Matko et al. | 345/7 |

(Continued)

FOREIGN PATENT DOCUMENTS
WO    WO2007/016613 A2    2/2007

*Primary Examiner* — Victor Batson
*Assistant Examiner* — Matthew Sullivan
(74) *Attorney, Agent, or Firm* — Paul & Paul

(57) ABSTRACT

A sliding and rotating hinge module for supporting a display screen or the like, includes a bracket, a slider and a support member. The slider is capable of sliding movement relative to said bracket and said support member is capable of pivotal movement relative to said slider.

19 Claims, 9 Drawing Sheets

U.S. PATENT DOCUMENTS

| | | |
|---|---|---|
| 6,997,373 B2 * | 2/2006 | Flores .............................. 232/29 |
| 7,010,833 B2 * | 3/2006 | Duarte et al. ................... 16/358 |
| 7,626,357 B2 * | 12/2009 | Hoffman et al. ............. 320/110 |
| 2004/0123782 A1 | 7/2004 | Korber et al. |
| 2005/0056755 A1 | 3/2005 | Kimura |
| 2007/0164645 A1 * | 7/2007 | Chen et al. ............... 312/334.47 |
| 2008/0185992 A1 * | 8/2008 | Hoffman et al. ............. 320/110 |
| 2008/0196201 A1 * | 8/2008 | Anderson ....................... 16/232 |
| 2009/0007383 A1 * | 1/2009 | Lee ................................. 16/362 |
| 2009/0234975 A1 * | 9/2009 | Chang et al. ...................... 710/1 |

* cited by examiner

SLIDING AND ROTATING HINGE MODULE

CROSS REFERENCE TO RELATED APPLICATIONS

This application claims the benefit of the priority of U.S. provisional application for patent Ser. No. 60/704,325, filed on Aug. 1, 2005.

BACKGROUND OF THE INVENTION

This invention generally relates to hinge modules and, more particularly, to a sliding and rotating hinge module.

Typically, hinges that provide constant-speed sliding and rotating motion have required motors or other actuators to do so. Such hinges are typically relatively complex and require electricity to power them. The added complexity of motorized hinges provides for an increased potential of failure, whether it be mechanical failure or failure to operate due to a power outage or a broken or faulty electrical connection. The added complexity also translates into higher costs for making, buying, using, and/or replacing the hinge. It would be desirable to have a less complex, less expensive hinge module that provides generally constant-speed sliding and rotating motion without the use of a motor or actuator or electricity to drive the hinge module.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
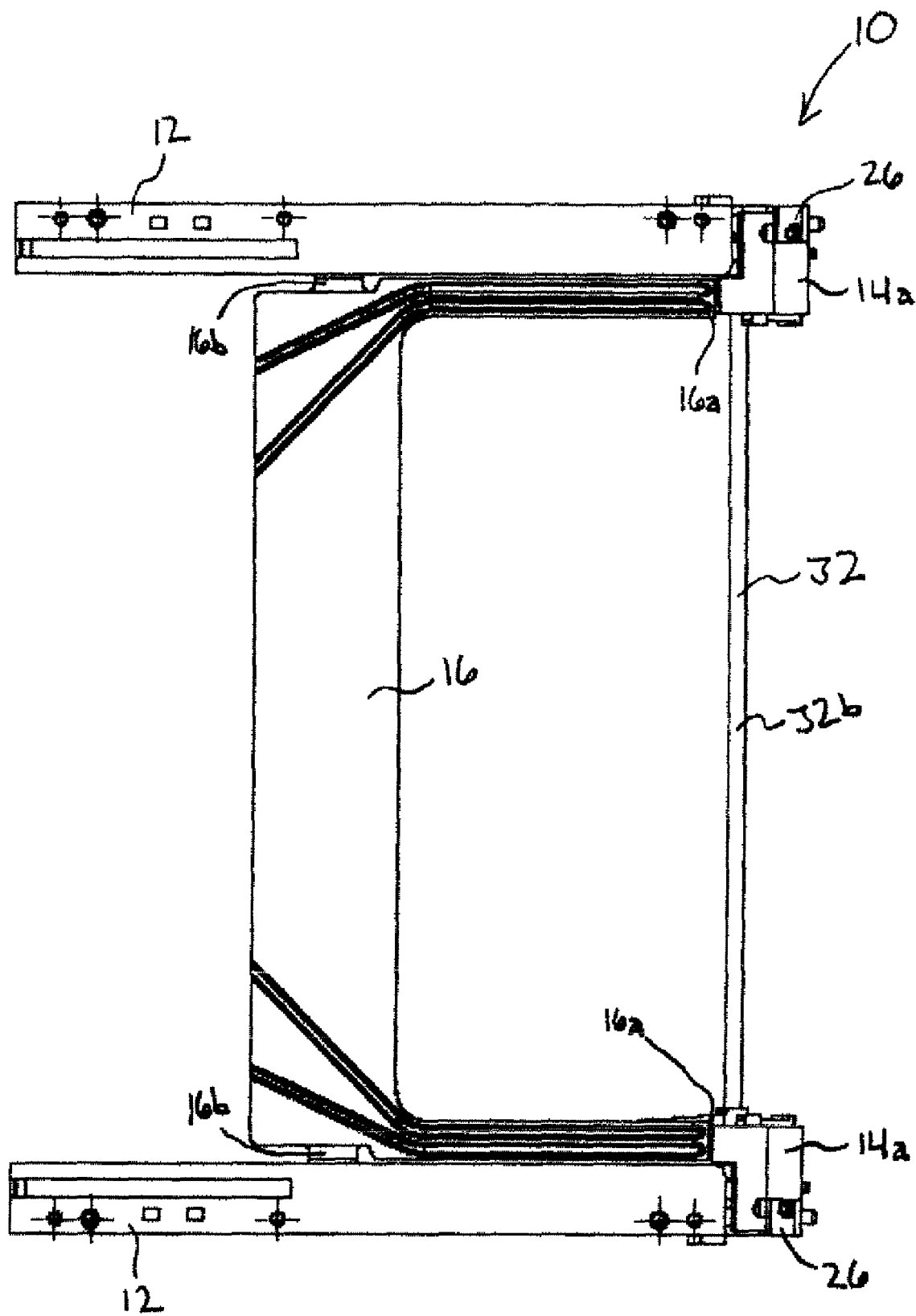
FIG. 1 is a bottom plan view of a hinge module in a stowed position in accordance with a first embodiment of the present invention.

Certain terminology is used in the following description for convenience only and is not limiting. The words "right," "left," "upper," and "lower" designate directions in the drawings to which reference is made. The terminology includes the words above specifically mentioned, derivatives thereof, and words of similar import.

Referring to the drawings in detail, wherein like numerals indicate like elements throughout, there is shown in FIGS. 1-6 a first embodiment of a sliding and rotating hinge module, indicated generally at 30, in accordance with the present invention. Referring to FIGS. 1-4, the hinge module 10 includes fixed channel brackets 12 which are fastened to a vehicle (not shown) or an object (not shown) in which the hinge module 10 is to be used. Preferably, there are two fixed brackets 12, although it is within the spirit and scope of the present invention that there be more or less than two fixed brackets 12. The two fixed brackets 12 are mounted to the vehicle or object so that the fixed brackets 12 are generally parallel to each other and similarly oriented such that fronts 12a of the fixed brackets 12 face in the same direction. Slidably mounted within each of the fixed brackets 12 is a slider 14. Preferably, each slider 14 slides outwardly in a direction of arrow A (FIG. 4) from the front 12a of the corresponding fixed bracket 12, the sliders 14 having a retracted position in which the majority of the sliders' 14 length is disposed within the fixed brackets 12 with only a front end 14a of each slider 14 extending outwardly from the front 12a of each fixed bracket 12, and an extended position in which the majority of the sliders' 14 length extends outwardly from the fronts 12a of the fixed brackets 12.

Referring to FIGS. 2-6, preferably, constant force springs 24 are fixed to each fixed bracket 12, proximate the front 12a. Preferably, the constant force springs 24 are flat coiled leaf springs, ends (not shown) of which are attached to the sliders 14. The constant force springs 24 apply a constant force to bias the sliders 14 outwardly from the fixed brackets 12. A damping grease(not shown) is preferably disposed between contacting surfaces of the sliders 14 and interiors of the fixed brackets 12 to damp the motion of the sliders 14 to cause the sliders 14 to extend outwardly from the fixed brackets 12 with a generally constant, smooth motion.

Figure 2:
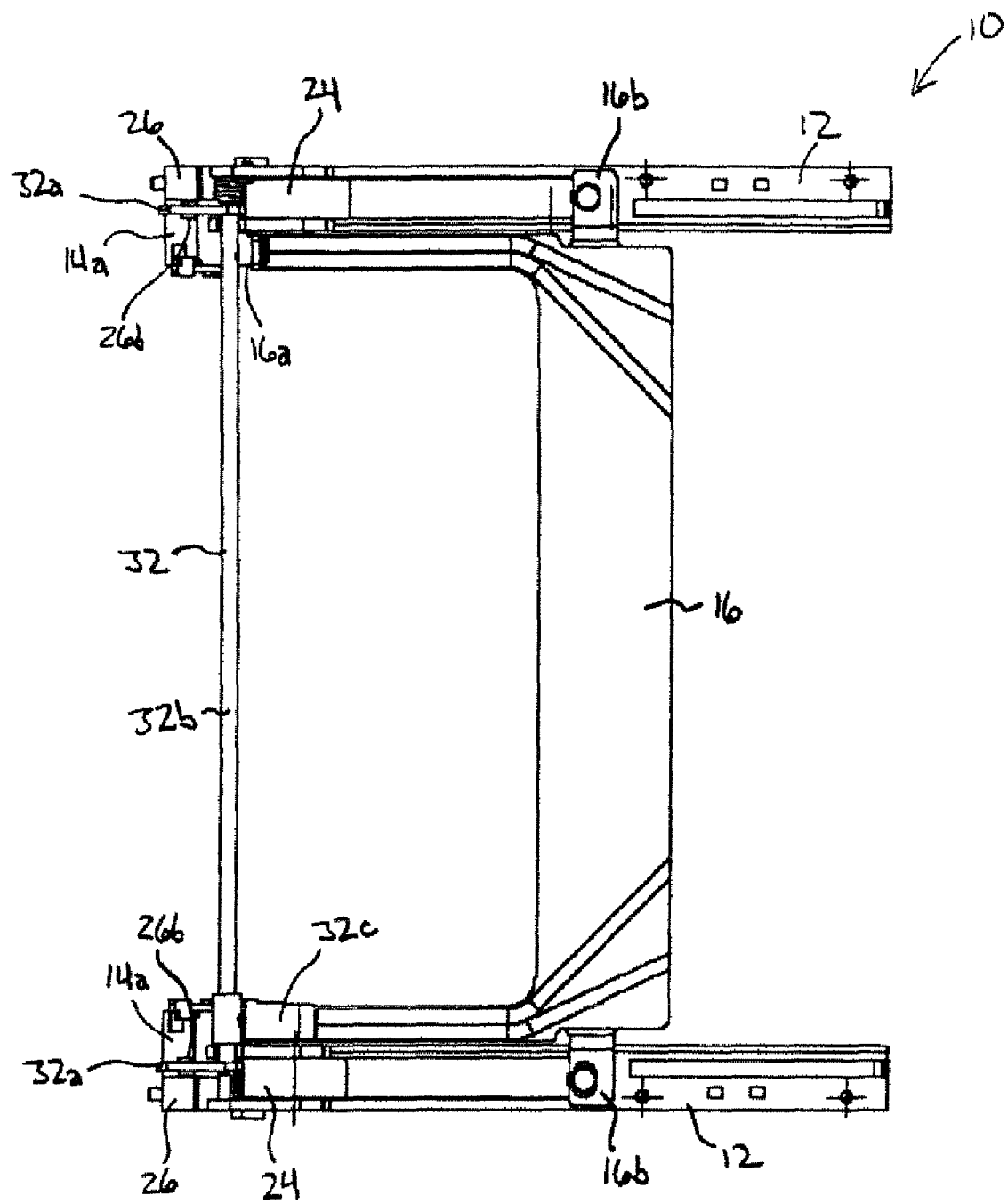
FIG. 2 is a top plan view of the hinge module of FIG. 1.
Figure 3:
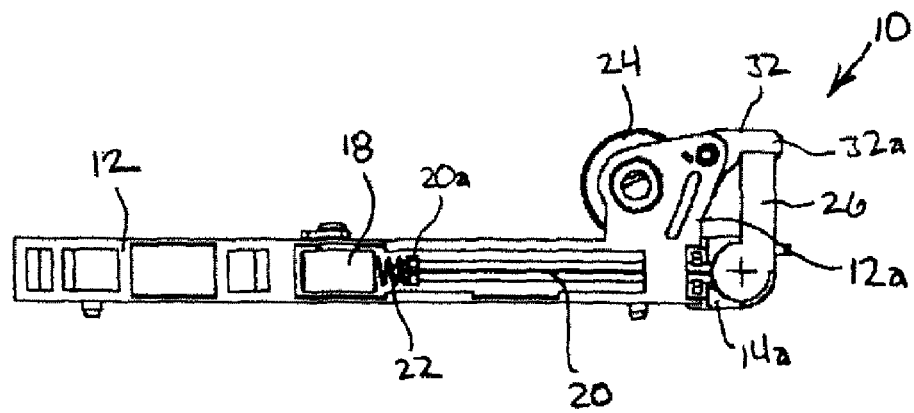
FIG. 3 is a left side elevational view of the hinge module of FIG. 1.
Figure 5:
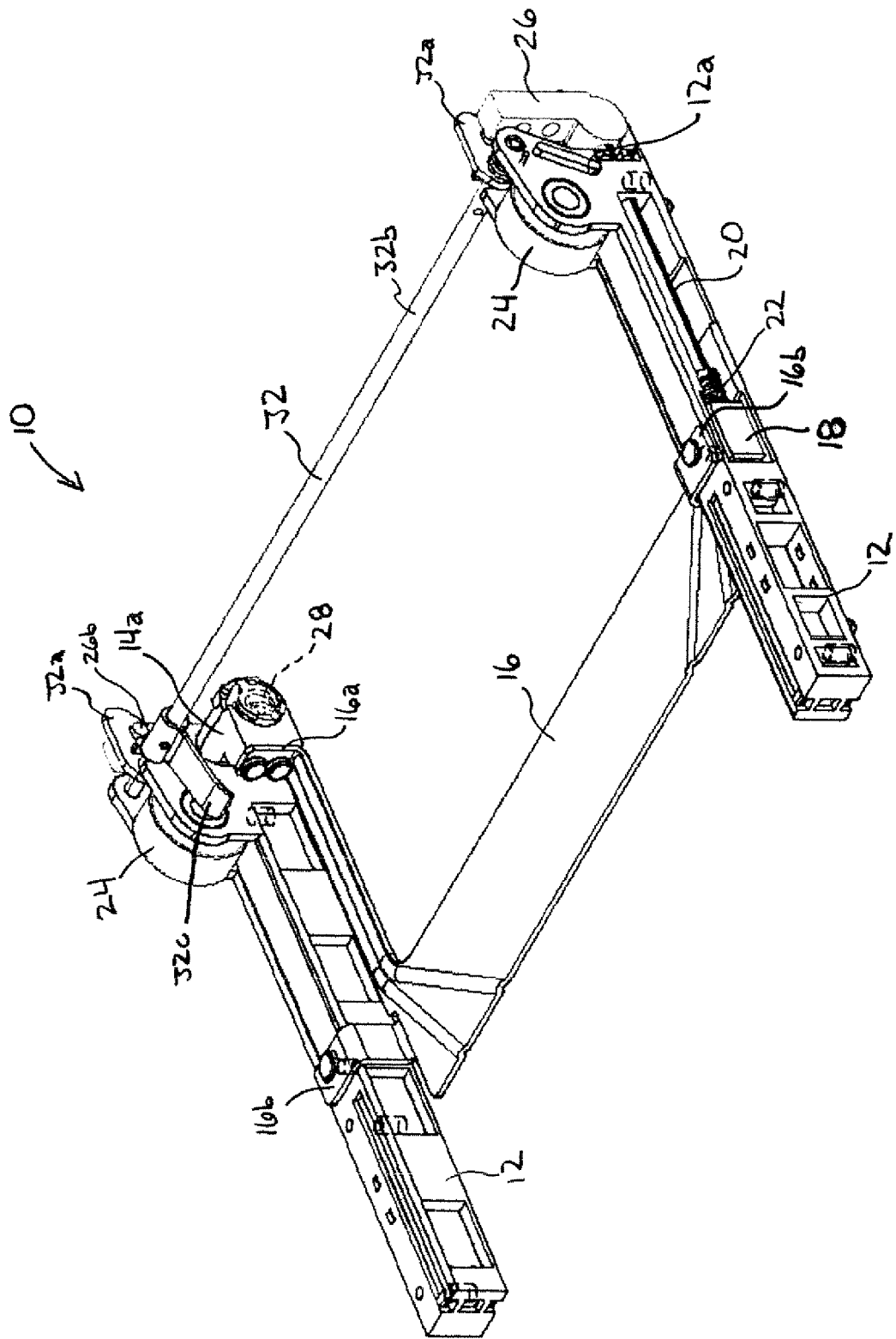
FIG. 5 is a left rear perspective view of the hinge module of FIG. 1.
Figure 6:
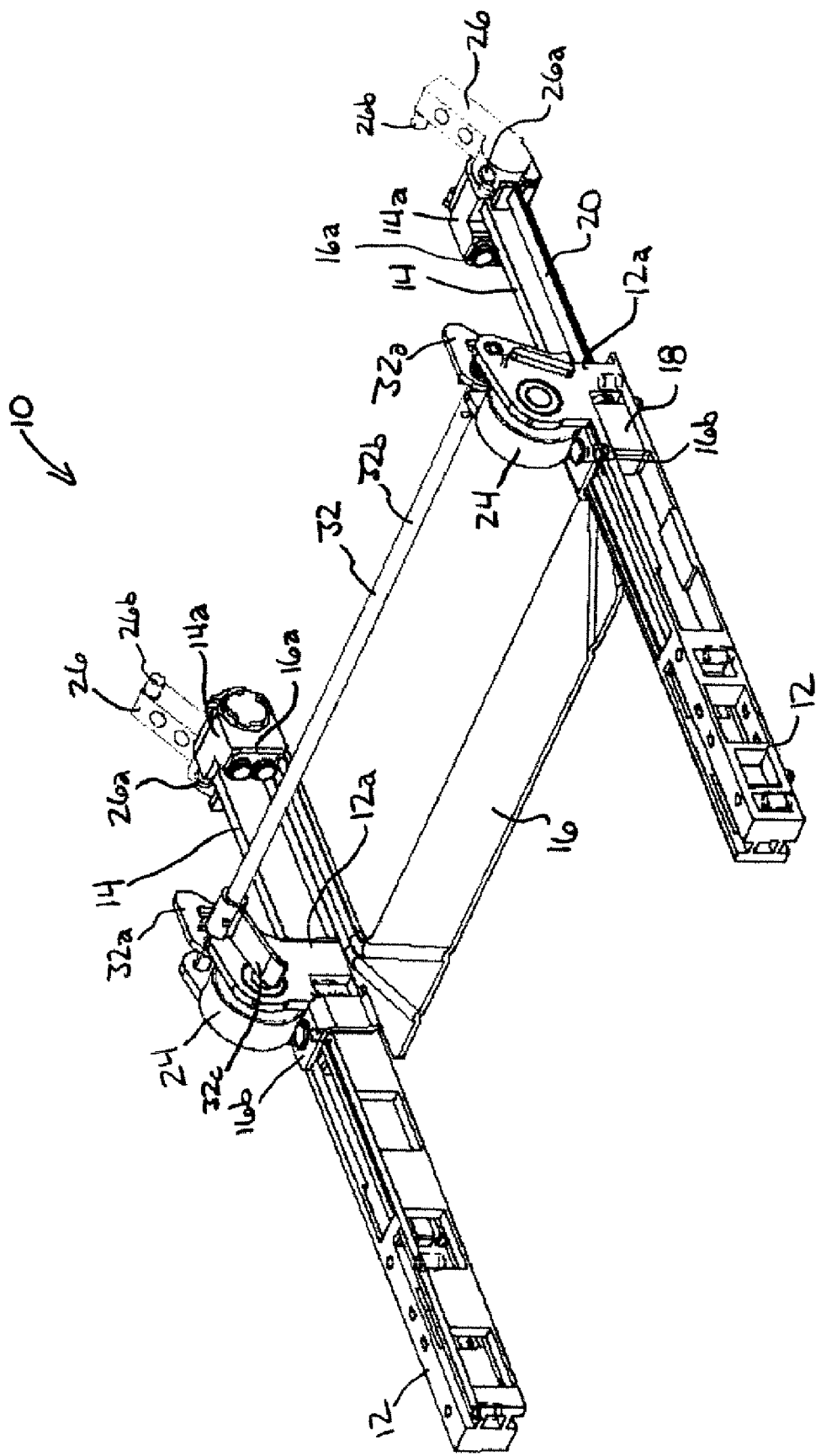
FIG. 6 is a left rear perspective view of the hinge module of FIG. 4.

Referring to FIGS. 2, 5, and 6, a drawer 16 is disposed between the fixed brackets 12 and is fixed to the sliders 14 to slide therewith. Preferably, the drawer 16 is generally U-shaped with the front ends 16a being fixed to the front ends 14a of the sliders 14 and L-shaped ears 16b extending upwardly and outwardly from proximate the back of the drawer 16. The ears 16b effectively ride along top surfaces of the fixed brackets 12 to support the back of the drawer 16.

Referring to FIGS. 3-6, a block 18 is fixedly engaged with each drawer ear 16b and is slidably disposed within each fixed bracket 12. Each block 18 has a hole (not shown) extending into the block 18 from a front face thereof A spring 22 (shown partially extending from within the block 18 in FIG. 3 and shown in phantom within the block 18 in FIG. 4) is disposed within each of the holes of the blocks 18.

Preferably, an elongate rod 20 is slidably en-aged within each of the fixed brackets 12 to extend outwardly from the front 12a of each fixed bracket 12, generally sliding with the sliders 14. Back ends of the rods 20 are disposed within the holes of the blocks 18 in contact with the springs 22, such that sliding of the blocks 18 and, consequently, the springs 22 in a forward direction pushes the rods 20 forwardly. Proximate the back end of each rod 20 is a radially extending circular flange 20a. Extending forwardly from a forward end of each rod 20 is a small protrusion or pin 20b (FIG. 4).

Figure 4:
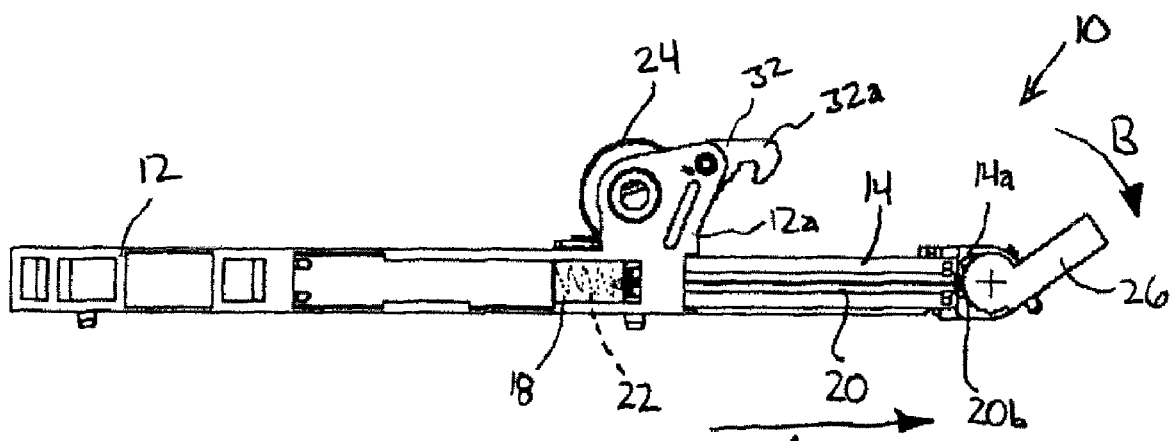
FIG. 4 is a left side elevational view of the hinge module of FIG. 1 in a deployed position.

Referring now to FIGS. 1-6, preferably rotatably engaged with the front ends 14a of the sliders 14 are rotating arms 26. The rotating arms 26 rotate in a direction of arrow B (FIG. 4)

from a first vertical position (FIGS. 1-3 and 5) to a second position (FIGS. 4 and 6), which is pivoted outwardly from the hinge module 10. The rotating arms 26 are preferably biased toward the second position by torsion springs 28 (shown in phantom in FIG. 5) disposed within the front ends 14a of the sliders 14. Preferably, the rotating arms 26 are attached to the front ends 14a by cylinder-within cylinder joints having damping grease disposed between contacting surfaces of the rotating arms 26 and the front ends 14a to achieve damped rotation of the rotating arms 26. Although this configuration is preferred it is within the spirit and scope of the present invention that different configurations be used, provided that they can perform in the manner described herein. Referring specifically to FIG. 6, a hole 26a is disposed within an exterior surface of each rotating arm 26 to accommodate and retain the protrusion 20b of the rod 20, as will be described below. Additionally, a protrusion 26b preferably extends inwardly from a side of each rotating arm 26. A display screen (not shown) or other object (not shown) is intended to be attached to the rotating arms 26 to rotate therewith.

Referring again to FIGS. 1-6, preferably, the hinge module 10 has at least a stowed position (FIGS. 1-3 and 5) in which the sliders 14 are in the retracted position and the rotating arms 26 are in the first position and a deployed position (FIGS. 4 and 6) in which the sliders 14 are in the extended position and the rotating arms 26 are in the second position. The constant force springs 24 and the torsion springs 28 bias the hinge module 30 in the deployed position.

Referring to FIGS. 4-6, a latch 32 is preferably used to retain the hinge module 10 in the stowed position. The latch 32 preferably includes a hook 32a rotatably mounted to the front 12a of each fixed bracket 12, preferably proximate tops thereof, to engage the protrusion 26b of each rotating arm 26 in order to retain the hinge module 10 in the stowed position. The hooks 32a are preferably rotatably coupled by a shaft 32b extending between the hooks 32a in a direction generally perpendicular to the fixed brackets 12. A tab 32c is preferably fixed to the shaft 32b. In this way, manipulation of the tab 32c causes rotation of the shaft 32b and, consequently, the hooks 32a to release the protrusions 26b of the rotating arms 26 in order to release the hinge module 10 from the stowed position. Preferably, an interface (not shown), such as a button (not shown) or lever (not shown), which is accessible to a user within the vehicle, is coupled to the tab 32c so that pushing of the button or rotating of the lever causes rotation of the tab 32c. In this way, the user can release the hinge module 10. Although the latch 32 discussed above is preferred, it is within the spirit and scope of the present invention that another device be used with the hinge module 10, provided it is capable of functioning to retain the hinge module 10 in the stowed position.

Preferably, the above-discussed components of the hinge module 10 are formed from one of a polymeric material and a metallic material. Preferably, the fixed brackets 12, the blocks 18, the rods 20, and the rotating arms 26 are made of die cast metal, such as, but not limited to zinc. Preferably, the block springs 22, the constant force springs 24, and the arm springs 28 are made of metal, such as, but not limited to, stainless steel for the constant force springs 24 and music wire for the block springs 22 and the arm springs 28. It is preferably that the drawer 16, the hooks 32a, the shaft 32b, and the tab 32c are also made of metal, such as, but not limited to, zinc plated steel the drawer 16, the hooks 32a, and the tab 32c and nickel plated steel for the shaft 32b. Lastly, it is preferably that the sliders 14 are made of a polymeric material, such as, but not limited to, a plastic such as glass filled Delrin, for instance, although it is possible to make the sliders 14 out of a metal such as die cast zinc, if desired. Although these materials are preferred, it is within the spirit and scope of the present invention that the components be made of different materials, provided the components can still function in the manner described herein.

In use, the hinge module 10 is preferably disposed within a motor vehicle for use with an in-dash navigation system (not shown). The fixed brackets 12 are fixed to and disposed substantially within a dashboard (not shown) of the vehicle and the display screen of the navigation system is attached to the rotating arms 26. During normal operation, the hinge module 10 is kept in the stowed position so that the display screen is substantially vertically oriented and flush with the front of the dashboard. When the user wishes to open the hinge module 10 (to change a data disk (not shown) within the navigation system, for instance), the user actuates the interface button or lever to unlatch the latch 32. The sliders 14 are then automatically pushed outwardly in the direction of arrow A (FIG. 4) toward the extended position by the constant force springs 24, in turn sliding the drawer 16 outwardly. Movement of the drawer 16 causes sliding movement of the locks 18 and springs 22 within the blocks 18 to push the back ends of the rods 20, thereby pushing the rods 20 outwardly from the fronts 12a of the fixed brackets with the sliders 14. Because the rods 20 move with the sliders 14, the protrusions 20b of the rods 20 remain disposed within the holes 26a of the rotating arms 26 in order to prevent the rotating arms 26 from rotating. Just before the sliders 14 reach the extended position, the flanges 20a of the rods 20 abut portions of the fixed brackets 12 to prevent further sliding motion of the rods 20. At this point the sliders 14, the drawer 16, and the blocks 18 continue sliding in the outward direction, compressing the springs 22 between the back ends of the (now stationary) rods 20 and the blocks 18. In this way, the rotating arms 26 are able to move away from the protrusions 20b of the front ends of the rods 20 to disengage the protrusions 20b from the holes 26a, thereby unconstraining the rotating arms 26 to allow rotation of the rotating arms 26 in the direction of arrow B (FIG. 4) from the first position to the second position to place the display screen in an orientation that is rotated from vertical, thereby placing the hinge module 10 in the deployed position and allowing access to the navigation system by the user. To place the hinge module 10 back into the stowed position, the user applies force to the display screen to rotate the rotating arms 26 back to the first position and then push the sliders 14 into the retracted position, allowing the latch 32 to re-engage the protrusions 26b of the rotating arms 26 and retain the hinge module 10 in the stowed position.

In this way, the hinge module 10 provides relatively constant sliding motion followed by relatively constant rotating motion when moving from the stowed position to the deployed position without the use of a motor. It is important to note that, although described with respect to a navigation system, the hinge module 10 can be used in any application in which such sliding motion followed by rotating motion is desired.

Referring now to FIGS. 7-12, a sliding and rotating hinge module 100 of a second embodiment is generally similar to the hinge module 10 of the first embodiment, in that it provides sliding motion followed by rotating motion. Referring to FIGS. 7-10, the hinge module 100 includes a fixed bracket 112 which is fixedly attached to a vehicle (not shown) or other object (not shown). The fixed bracket 112 preferably has elongate tracks 112a disposed along inner sides thereof. It is preferable that there are two elongate tracks 112a mounted within the fixed bracket 112, although it is within the spirit and scope of the present invention that there be more or less than two elongate tracks 112a.

Figure 7:
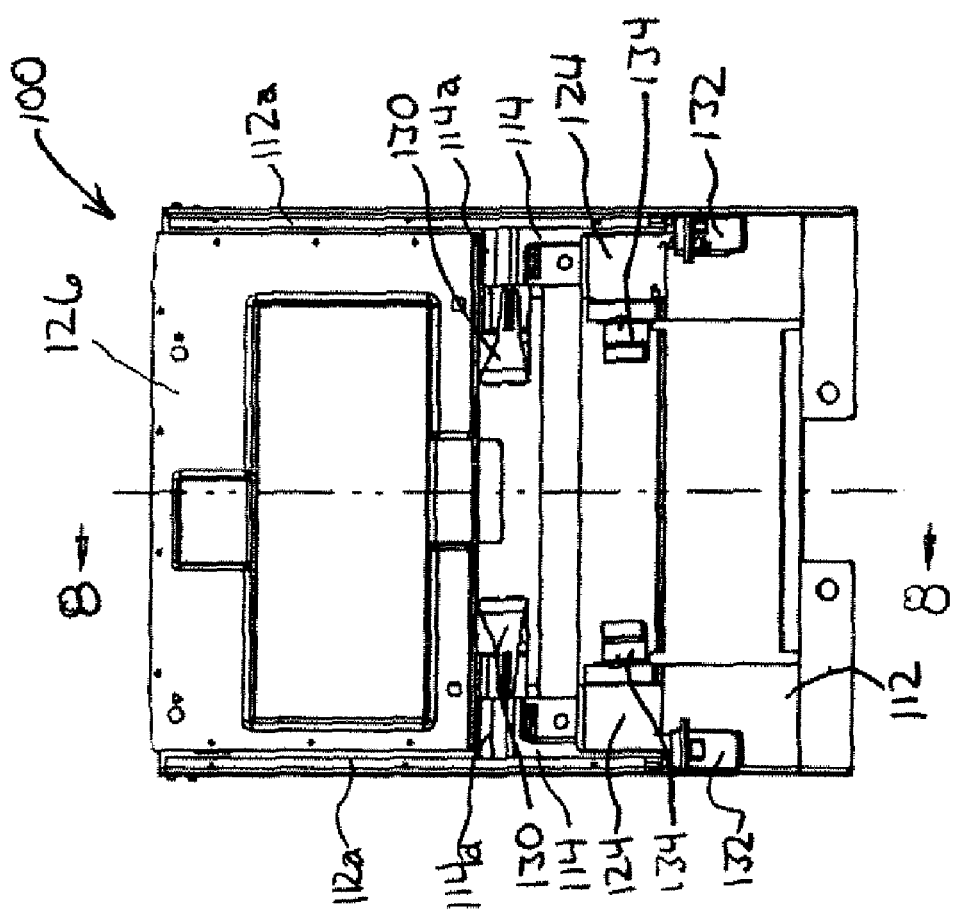
FIG. 7 is a front elevational view of a hinge module in a stowed position in accordance with a second embodiment of the present invention.
Figure 8:
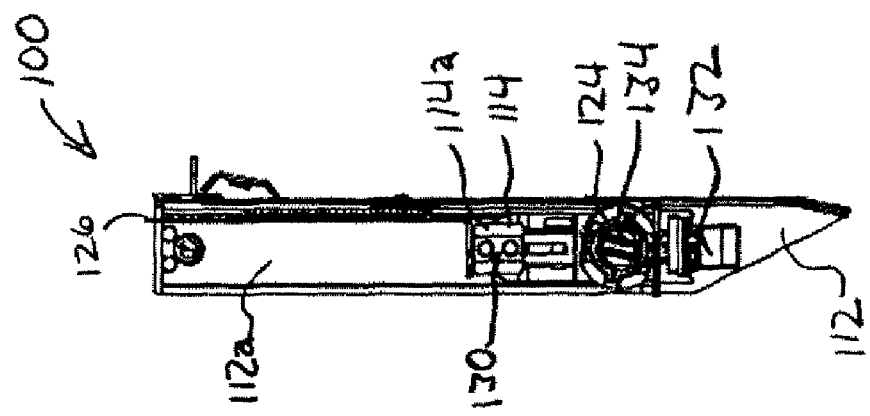
FIG. 8 is a cross-sectional view of the hinge module of FIG. 7 taken along line 8-8.
Figure 10:
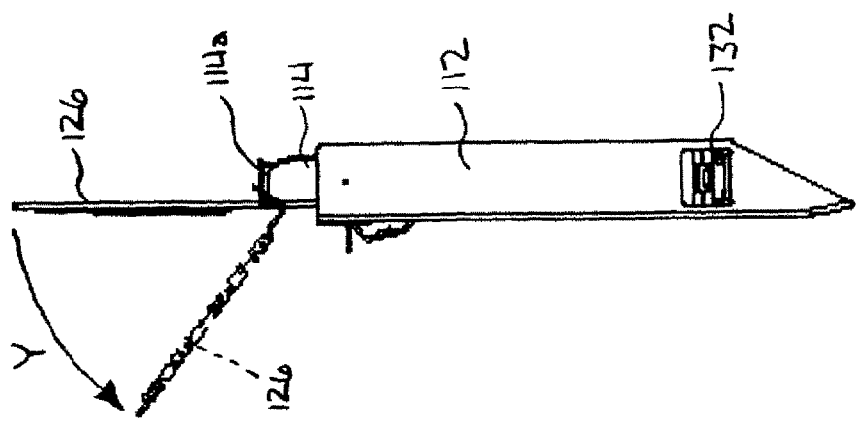
FIG. 10 is a left side elevational view of the hinge module of FIG. 9.
Figure 11:
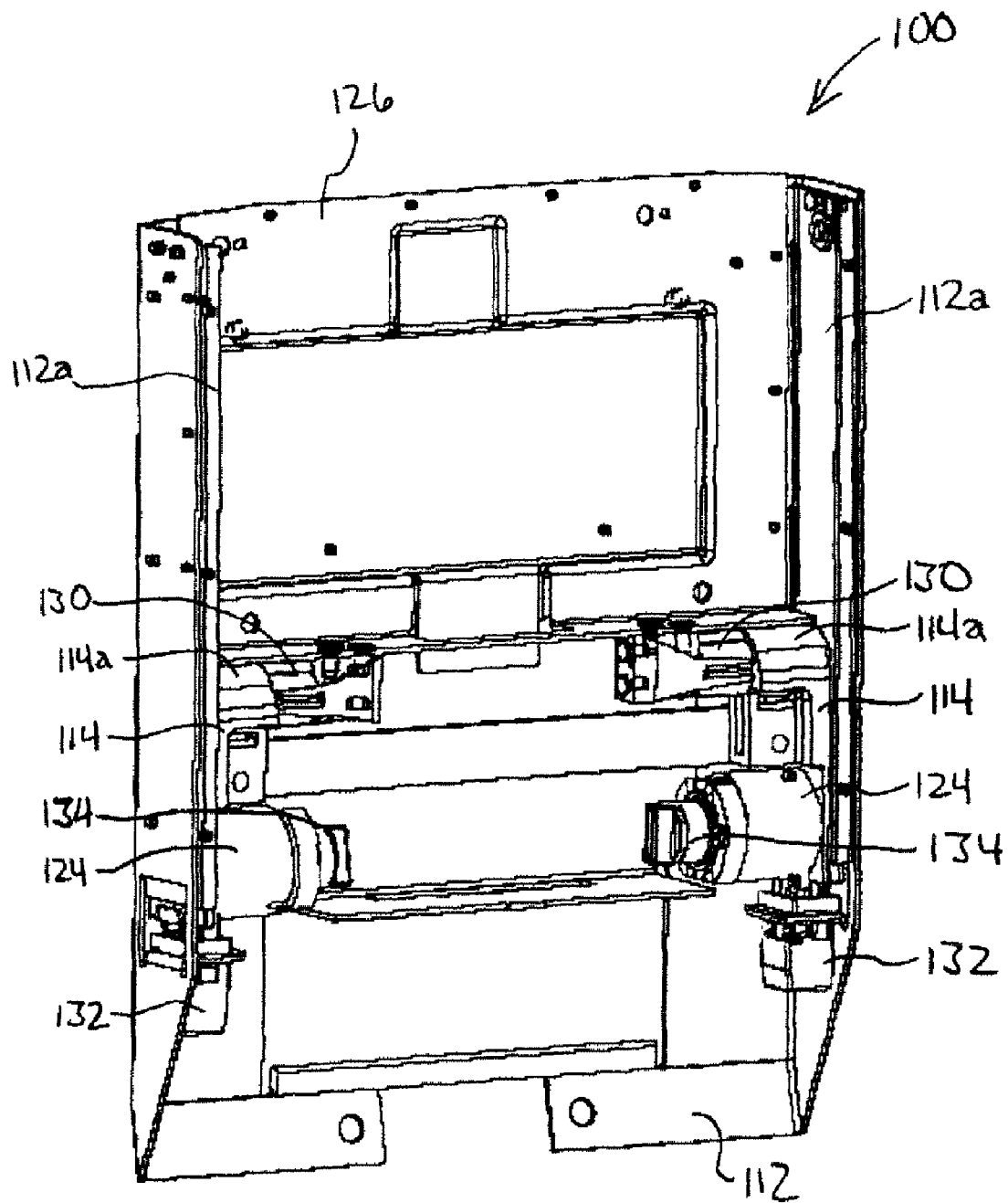
FIG. 11 is a left rear perspective view of the hinge module of FIG. 7.
Figure 12:
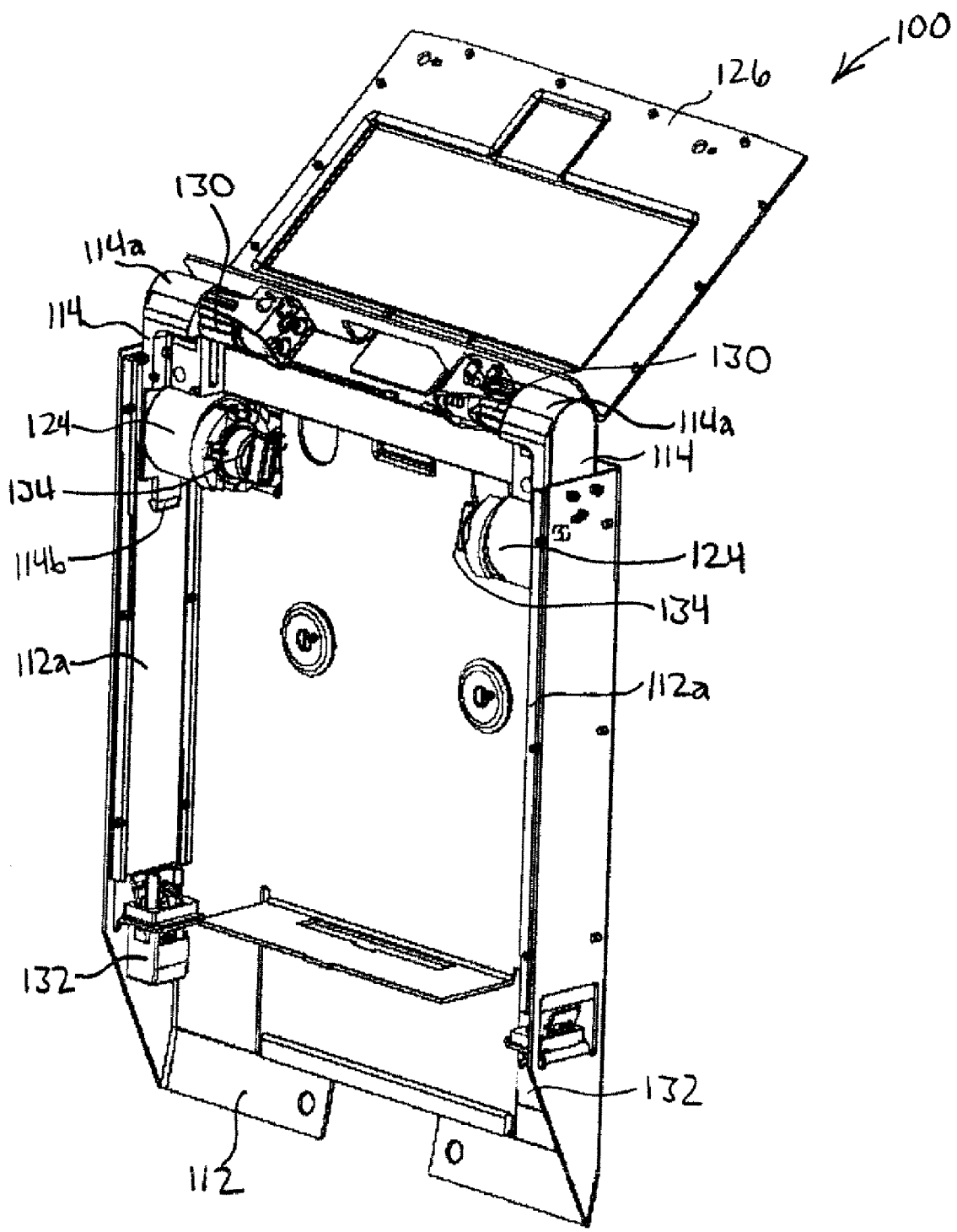
FIG. 12 is a right rear perspective view of the hinge module of FIG. 9.

Referring to FIGS. 7, 11, and 12, preferably riding along each track 112a is a slider 114 having a front end 114a and a hook 114b (FIG. 12) extending rearwardly from a back end. Secured to each slider 114 is a constant force spring 124, similar to the constant force spring 24 described above, having ends attached to the fixed bracket 112. A rotating tray 126 is preferably rotatably attached with friction hinges 130 to the front ends 114a of the sliders 114. Disposed proximate a bottom of the fixed bracket 112 are latches 132 for releasable engagement with the hooks 114b of the sliders 114.

Figure 9:
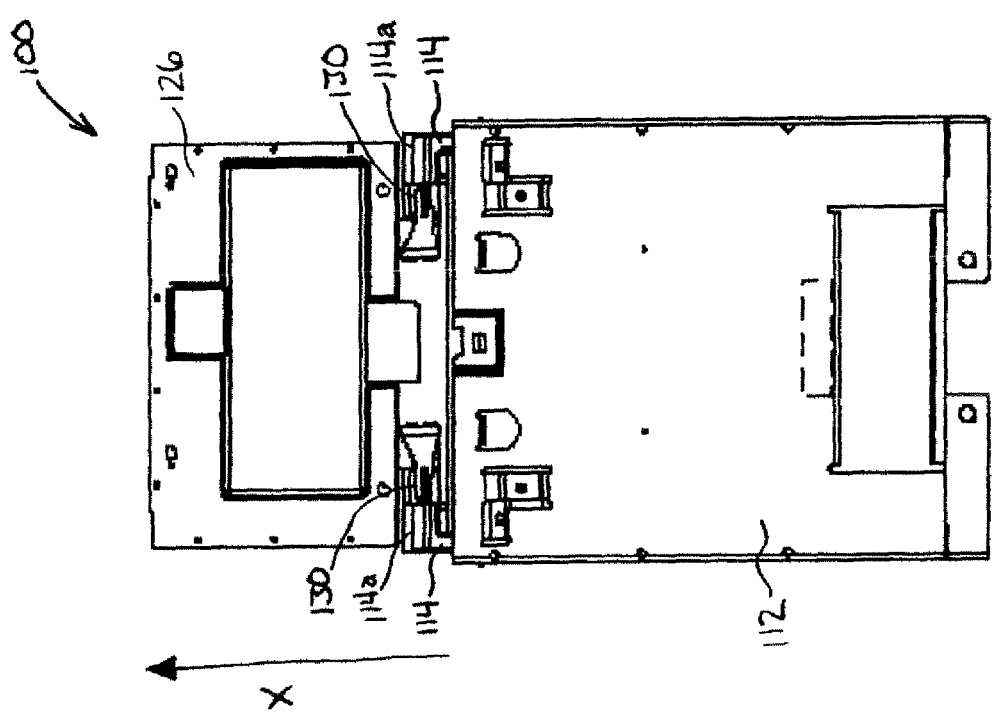
FIG. 9 is a rear elevational view of the hinge module of FIG. 7 in a deployed position.

Referring to FIGS. 7-12, the hinge module 100 preferably has at least a stowed position (FIGS. 7, 8, and 11) in which the sliders 114 are downwardly disposed within the fixed bracket 112 such that the hooks 114b of the sliders 114 are engaged with and secured by the latches 132 and a deployed position (FIGS. 9, 10, and 12) in which the sliders 114 are upwardly disposed within the fixed bracket 112. The constant force springs 124 bias the sliders 114 upwardly, such that disengagement of the latches 132 automatically causes the sliders 114 to move upwardly along the tracks 112a in a direction of arrow X (FIG. 9). It is intended that a display screen (not shown) or other object (not shown) is mounted to the rotating tray 126 to rotate therewith.

The latches 132 are such that pushing downwardly on the display screen engaged with the rotating tray 126 when the hinge module 100 is in the stowed position causes disengagement of the latches 132 to allow the hinge module 100 to move toward the deployed position. Damping grease (not shown) is preferably disposed on the inside surface of the tracks 112a to contact an outer surface of the sliders 114 in order to damp the sliding motion of the sliders 114. Preferably, rotational dampers 134 are engaged with the constant force springs 124 to damp rotation of the constant force springs 124 and provide additional damping of the sliding motion of the sliders 114. In this way, the constant force springs 124, the damping grease, and the rotational dampers 134 provide for generally constant sliding motion of the sliders 114 along the tracks 112a. Although it is preferred that the damping grease be used in conjunction with the rotational dampers 134, it is within the spirit and scope of the present invention that a different damping means be used instead of one or both of the damping grease and the rotational dampers 134 or, alternatively, if less damping is desired, that only one of the damping grease and the rotational dampers 134 be used with the hinge module 100. If no damping is desired, it is further contemplated by the present invention that the hinge module 100 can be used without the damping grease and the rotational dampers 134.

Once in the deployed position, the rotating tray 126 can be manually rotated in a direction of arrow Y (FIG. 10) by the user. Preferably, the friction hinges 130 allow the rotating tray 126 to maintain whatever rotational position is desired. Although friction hinges 130 are preferred, it is within the spirit and scope of the present invention that alternate devices be used to allow the tray 126 to be rotated by the user, provided the alternate devices allow the tray 126 to be retained in the rotated orientation. It is further contemplated that the friction hinges 130 be replaced with spring-biased pivots similar to those described above with respect to the first embodiment to allow the tray 126 to rotate automatically without requiring the user to manually rotate the tray 126 into a desired position. Also, although the latches 132 discussed above are preferred, it is within the spirit and scope of the present invention that other devices be used with the hinge module 100, provided they are capable of functioning to retain the hinge module 100 in the stowed position.

Preferably, the above-discussed components of the hinge module 100 are formed from one of a polymeric material and a metallic material. Preferably, the fixed bracket 112, the tracks 112a, and the rotating tray 126 are made of metal, such as, but not limited to steel for the fixed bracket 112 and the rotating tray 126 and aluminum for the tracks 112a. Preferably, the constant force springs 124 are also made of metal, such as, but not limited to, stainless steel. Lastly, it is preferably that the sliders 14 and the latches 132 are made of a polymeric material, such as, but not limited to, a plastic such as glass filled Delrin, for instance, although it is possible to make the sliders 14 and/or the latches 132 out of a metal such as die cast zinc, if desired. Although these materials are preferred, it is within the spirit and scope of the present invention that the components be made of different materials, provided the components can still function in the manner described herein.

In use, preferably, the hinge module 100 is intended to be vertically mounted in a rear seat center console (not shown) of a vehicle for mounting a DVD player display (not shown) therein. The fixed bracket 112 is secured within the console or other component (not shown) of the vehicle so that, when in the stowed position, a top of the display screen is generally flush with a top of the console. To open the DVD player, the user pushes downwardly on the top of the display screen to disengage the hooks 114b from the latches 132. Unconstrained the constant force springs 124 pull the sliders 114, and consequently the rotating tray 126 and display screen, upwardly along the tracks 112a until the sliders 114 reach their upwardmost position along the tracks 112a, thereby placing the hinge module 100 in the deployed position and exposing the entire display screen above the top of the console. The user can then rotate the display screen and the rotating tray 126 to obtain the desired viewing angle with the friction hinges 130 maintaining that viewing angle. To close the DVD player, the user rotates the display screen into a substantially vertical orientation and then pushes downwardly on the top of the display screen to move the rotating tray 126 and the sliders 114 downwardly along the tracks 112a until the hooks 114b re-engage with the latches 132 to retain the hinge module 100 in the stowed position. In this way, the hinge module 100 provides for generally constant speed sliding motion followed by manual rotation. Although described with respect to a DVD player, it is noted that the hinge module 100 could be used in any application in which such sliding and rotating motion is desired.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

The invention claimed is:
1. A sliding and rotating hinge module comprising:
at least one bracket adapted for fastening to a vehicle, said bracket having a front;
a slider mounted within said bracket and supported for sliding movement relative to said bracket between a retracted position and an extended position, said slider having a front end, said front end of said slider extending outwardly from said front of said bracket when said slider is in said retracted position;

a constant force spring provided between said bracket and said slider and biasing said slider toward said extended position;

a support member pivotally attached to the slider proximate said front end of said slider, said support member being pivotally movable relative to said slider between a first position and a second position at least when said slider is in said extended position, said support member being spring biased toward said second position relative to said slider, wherein said support member is adapted for supporting a display screen;

a latch provided for selectively holding said slider in said retracted position, said latch engaging said support member in order to hold said slider in said retracted position; and said support member being attached proximate said front end of said slider by a cylinder-within-cylinder joint having damping grease disposed between surfaces of said support member and of said slider defined by said cylinder-within-cylinder joint for damping pivotal movement of said support member relative to said slider.

2. The sliding and rotating hinge module according to claim 1, further comprising:
a secondary latch system for holding said support member in said first position relative to said slider as said slider moves between said retracted position and said extended position.

3. The sliding and rotating hinge module according to claim 2, wherein said secondary latch system is automatically actuated to release said support member for rotation from said first position to said second position when said slider reaches said extended position.

4. The sliding and rotating hinge module according to claim 1, wherein said support member is spring biased toward said second position relative to said slider by a torsion spring provided proximate said front end of said slider.

5. The sliding and rotating hinge module according to claim 1 claim 4, wherein said support member is a rotating arm adapted for supporting a display screen.

6. The sliding and rotating hinge module according to claim 5, wherein said latch comprises a hook pivotally attached to said bracket, wherein said support member further comprises a protrusion fixed to said rotating arm, and wherein said hook is capable of engaging said protrusion in order to hold said slider in said retracted position with said rotating arm in said first position.

7. The sliding and rotating hinge module according to claim 1, wherein said at least one bracket is a first bracket, said slider is a first slider, said constant force spring is a first constant force spring, said support member is a first support member, and said latch is a first latch, wherein said first position is a first position of said first support member and said second position is a second position of said first support member, and wherein the sliding and rotating hinge module further comprises:
a second bracket adapted for fastening to the vehicle in parallel to said first bracket, said second bracket having a front;
a second slider mounted within said second bracket and supported for sliding movement relative to said second bracket between a retracted position and an extended position, said second slider having a front end, said front end of said second slider extending outwardly from said front of said second bracket when said second slider is in said retracted position of said second slider;
a second constant force spring provided between said second bracket and said second slider and biasing said second slider toward said extended position of said second slider;
a second support member pivotally attached to the second slider, said second support member being pivotally movable relative to said second slider between a first position and a second position at least when said second slider is in said extended position of said second slider; and
a second latch provided for selectively holding said second slider in said retracted position of said second slider.

8. The sliding and rotating hinge module according to claim 7, wherein said first latch is capable of engaging said first support member in order to hold said first slider in said retracted position of said first slider, and
wherein said second latch is capable of engaging said second support member in order to hold said second slider in said retracted position of said second slider.

9. The sliding and rotating hinge module according to claim 8, wherein said second support member is spring biased toward said second position of said second support member relative to said second slider.

10. The sliding and rotating hinge module according to claim 9, wherein said first support member is spring biased toward said second position of said first support member relative to said first slider by a first torsion spring provided proximate said front end of said first slider, and
wherein said second support member is spring biased toward said second position of said second support member relative to said second slider by a second torsion spring provided proximate said front end of said second slider.

11. The sliding and rotating hinge module according to claim 10, wherein said first support member is a first rotating arm adapted for supporting a display screen, and
wherein said second support member is a second rotating arm adapted for cooperatively supporting the display screen.

12. The sliding and rotating hinge module according to claim 11, wherein said first latch comprises a first hook pivotally attached to said first bracket, wherein said first support member further comprises a first protrusion fixed to said first rotating arm, and wherein said first hook is capable of engaging said first protrusion in order to hold said first slider in said retracted position of said first slider with said first rotating arm being in said first position of said first rotating arm, and
wherein said second latch comprises a second hook pivotally attached to said second bracket, wherein said second support member further comprises a second protrusion fixed to said second rotating arm, and wherein said second hook is capable of engaging said second protrusion in order to hold said second slider in said retracted position of said second slider with said second rotating arm being in said first position of said second rotating arm.

13. The sliding and rotating hinge module according to claim 12, wherein said first hook and said second hook are coupled together by a shaft so as to rotate together as a unit.

14. A sliding and rotating hinge module comprising:
at least one bracket adapted for fastening to a vehicle;
a slider mounted within said bracket and supported for sliding movement relative to said bracket between a retracted position and an extended position, said slider having a front end and a back end;
a constant force spring provided between said bracket and said slider and biasing said slider toward said extended position;

a support member pivotally attached to the slider proximate said front end of said slider, said support member being pivotally movable relative to said slider between a first position and a second position at least when said slider is in said extended position, wherein said support member is adapted for supporting a display screen;

a latch provided for selectively holding said slider in said retracted position, said latch being attached to said bracket; and a hook provided at said back end of said slider and at spaced separation from said support member, wherein said hook is engaged by said latch in order to hold said slider in said retracted position.

15. The sliding and rotating hinge module according to claim 14, wherein said latch is of a type such that, when a display is attached to said support member and the slider is in the retracted position, the display is pushed in a direction opposite a direction in which said slider moves to reach said extended position in order for said latch to release said slider from said retracted position.

16. The sliding and rotating hinge module according to claim 14, further comprising:

a hinge pivotally supporting said support member relative to said slider, wherein said hinge is adapted to maintain said support member at a user selected angular position relative to said slider selected from a range of angular positions between and including said first position and said second position.

17. The sliding and rotating hinge module according to claim 16, wherein said support member is a tray adapted for supporting a display screen.

18. The sliding and rotating hinge module according to any one of claims 1 and 16, further comprising:

damping means for damping said sliding movement of said slider relative to said bracket.

19. The sliding and rotating hinge module according to claim 16, wherein said latch is of a type such that, when a display is attached to said support member and the slider is in the retracted position, the display is pushed in a direction opposite a direction in which said slider moves to reach said extended position in order for said latch to release said slider from said retracted position.

* * * * *